Jan. 2, 1968 L. R. HOUGEN Re. 26,329
PROCESS FOR CLEANING WASTE WATER [SUCH AS SEWAGE WATER]
Original Filed Jan. 14, 1957
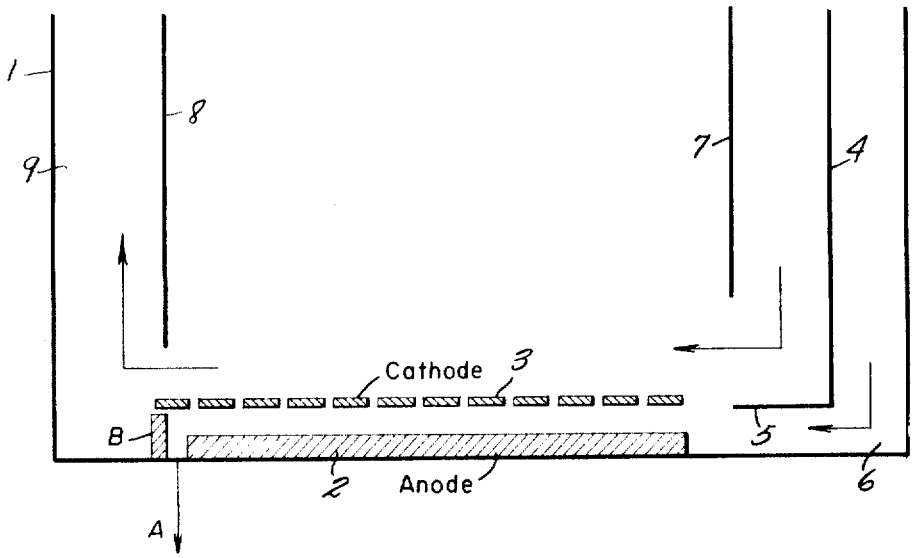
INVENTOR.
LEIF R. HOUGEN
BY
Eyre, Mann & Lucas
ATTORNEYS.

United States Patent Office

Re. 26,329
Patented Jan. 2, 1968

26,329

PROCESS FOR CLEANING WASTE WATER [SUCH AS SEWAGE WATER]

Leif R. Hougen, Trondheim, Norway, assignor to Elektrokemisk A/S, Oslo, Norway, a corporation of Norway Original No. 3,035,992, dated May 22, 1962, Ser. No. 634,017, Jan. 14, 1957. Application for reissue May 21, 1964, Ser. No. 380,728

4 Claims. (Cl. 204—149)

Matter enclosed in heavy brackets [ ] appears in the original patent but forms no part of this reissue specification; matter printed in italics indicates the additions made by reissue.

*ABSTRACT OF THE DISCLOSURE*

*An aqueous liquid of relatively low density containing alkali-precipitable substances and an aqueous liquid of relatively high density containing sodium chloride are flowed as upper and lower layers respectively through an electrolytic cell in direct contact with each other. The liquids are electrolyzed by means of a cathode positioned in the upper layer and an anode positioned in the lower layer whereby sodium hydroxide and hydrogen are evolved at the cathode and chlorine is evolved at the anode. The resulting alkalinity in the upper liquid causes precipitation of the alkali-precipitable substances therein and these precipitates are lifted to the surface of the upper liquid by the hydrogen rising up from the cathode.*

The present invention relates to a process for cleaning waste water. The process is especially developed in connection with the cleaning of sewage water, but it can also be advantageously used for cleaning other types of waste water—for example, from industrial plants. Such waste water contains substances which should be recovered for economic reasons or removed to prevent contamination of the sea or river receiving the waste water.

It has previously been proposed to remove undesired substances from water by electrolytic precipitation. It has thus been proposed to clean sewage water by adding small quantities of sea water to make it electrically conductive and, subsequently, electrolysing it in a cell provided with a diaphragm. During the electrolysis, the sewage water in the cathode compartment will become alkaline and magnesium hydroxide will precipitate and, simultaneously, the phosphates present in the sewage will be precipitated as magnesium phosphates. These fluffy precipitates have an occluding effect on the fine mud particles and colloids. Due to the evolution of hydrogen on the cathode, the magnesium precipitates and the mud particles will float to the surface where they can be collected. The cleaned sewage water is led into the sea.

Removal of phosphates from sewage water has lately become an important problem as the amount of dissolved inoragnic fertilizers is believed to be the main cause of too rich a growth of algae and of putrification in the recipients.

The object of the diaphragm is to prevent mixing of the electrolytes of the anode and cathode compartments which, at the same time, ions under the influence of the electric current will be able to penetrate through the fine pores of the diaphragm.

The drawbacks connected with the use of a diaphragm are well-known: the diaphragm will be easily clogged up—for example, by mud particles, colloidal substances, precipitated inorganic salts, etc., and this necessitates replacing the diaphragm relatively often, or frequently removing it from the apparatus for cleaning and inspection. In spite of these known drawbacks of the diaphragm, it has hitherto not been considered possible to do without it.

The inventor has investigated this problem closely and has come to the conclusion that it is possible to carry out the electrolysis of sewage water in such a way that the anolyte and catholyte are kept separate without the use of a diaphragm, and in such a way that the chlorine gas developed on the anode will not have the opportunity of mixing with the catholyte or pass on to the cathode, in spite of the fact that horizontal electrodes are employed in the process.

In the process according to this invention, the sewage water is subjected to electrolysis, using as catholyte the sewage water, to which, if necessary, small quantities of electrolytes have been added, especially sea water. The anolyte consists of a salt solution—especially sea water—having a higher specific gravity than the catholyte. The electrolysis is, as mentioned above, carried out without the use of a diaphragm for separating anolyte and catholyte. This is achieved by causing a bottom layer of the heavier anolyte to pass continuously over a bottom anode in a slow, quiet flow without turbulence, while the lighter catholyte passes over the cathode. A small part of the catholyte will also pass under the cathode, which is placed horizontally above the anode and has approximately the same surface area as the latter. The cathode can, for instance, be made from steel ribs, steel wiring or the like.

It has been found that due to the difference in specific gravities, even though it is not so great, it is possible to establish a distinct separating layer between the two flowing liquids.

As the sea water flows continuously over the bottom anode, the chlorine developed on the anode will, from the moment of evolution, be carried towards the outlet for the liquid whereby its rising motion will be hampered. In spite of this, part of the chlorine will be able to pass into the layer of sewage water and even to the cathode, thus causing trouble. However, this can be prevented, according to the present process, by adjusting the height of the anolyte layer above the anode and the quantity of passing anolyte in relation to the electric current supplied, so that no more chlorine is formed than will dissolve in the sea water flowing through the apparatus.

The amount of chloride in sea water is about 1.7% and the solubility of chlorine in sea water is about 0.7% at 20° C. The operation must, consequently, be carried out in such a way that the concentration of chlorine in the sea water will not exceed about 0.7% and, as a rule, it is preferable to operate with a chlorine content considerably below this limit. When operating in this way, no gaseous chlorine will rise through the sea water layer up to the sewage water.

To facilitate the understanding of the process according to this invention, a practical example with reference to the appended schematic drawing is given below. The drawing shows a vertical section through an apparatus for carrying out the process.

On the drawing 1 is the electrolytic cell, in the bottom of which is an anode 2, for example, of graphite. Above the anode, a cathode 3 is placed, made from steel ribs, steel wiring or the like. The anode and cathode have approximately the same area and both of them extend throughout the entire electrolytic cell at right angles to the section illustrated: that is, at right angles to the direction of the flow of liquids, which is indicated by arrows. Along one side wall of the electrolytic cell, a separating wall 4 is arranged, provided with a guiding plate 5 at right angles to the wall 4. This plate extends towards the middle of the cell and ends just above the edge of the anode 2. The sea water is introduced through the passage 6 between the cell wall and the separating wall. Further, another vertical separating wall 7 is arranged in the electrolytic cell which also extends throughout the cell. In the space between the walls 4 and 7, the sewage water is introduced which is mixed with, for instance, 15% sea water to improve its conductivity and to provide the desired content of magnesium and sodium ions. Along the opposite side wall of the electrolytic cell, a third separating wall 8 is arranged so that a passage 9 is formed for discharge of the treated, cleaned sewage water. When the sea water and sewage are introduced into the apparatus as described, the sewage will rise in the space between walls 7 and 8 and its level will, of course, be determined by the balance of the hydraulic forces. At the bottom of the electrolytic cell, a dam wall B extends throughout the cell. Its height corresponds to the level of the separating layer between sea water and sewage water. Sea water and sewage water are supplied in such adjusted quantities that a practically constant separating layer is maintained just below the cathode on a level with the guiding plate 5, as indicated on the drawing.

During electrolysis, chlorine will develop at the anode and sodium hydroxide will be formed at the cathode accompanied by evolution of hydrogen. The supply of current is, as previously mentioned, adjusted in relation to the quantity of flowing sea water in such a way that all the evolved chlorine is dissolved in the sea water and no gaseous chlorine will rise through the sea water up to the sewage water. The sodium hydroxide formed at the cathode will make the sewage water alkaline and magnesium hydroxide will be precipitated. The phosphates possibly present in the sewage water will precipitate as magnesium phosphates. These flocculent precipitates have an occluding effect on mud particles and colloids in the sewage water. This effect, combined with the action of the hydrogen gas rising through the sewage water, will transport the solid particles present to the surface where they are collected in any suitable way between the separating walls 7 and 8. The cleaned sewage water passes under the separating wall 8, up through the passage 9, between the cell wall 1 and the separating wall 8 and discharged together with the sea water. The sewage water will hereby be sterilized by the chlorine containing sea water. One may, however also discharge the chlorine containing sea water through the bottom of the electrolytic cell at the edge of the anode, as indicated by the arrow A on the drawing. It is also possible to use only a part of the chlorine containing sea water for sterilization of the sewage water by discharging, for example, 75% of the chlorine containing sea water at A, while the remainder flows over the dam wall B and is mixed with the cleaned sewage water. As will be understood, the drawing is purely diagrammatic and serves only to show the principle of the process, as it is not considered necessary to show details for introduction of the sea water and sewage water into the apparatus, nor for discharge of the cleaned sewage water or for removal of the impurities floating on the surface of the sewage water between the separating walls 7 and 8. It is obvious that the apparatus can be provided with devices for accurate adjustments, such as adjustment valves for the various liquids so that a constant separating layer between sewage water and sea water can be automatically maintained. For instance, float devices in the apparatus may be arranged perhaps of a type similar to that employed in soap production and other industries.

The chlorine containing sea water which is not mixed with the sewage water can be used separately for sterilizing surface water in the vicinity of the plant and also as a raw material for bromine production, etc.

I claim:

1. A process for the electrolytic cleaning of waste waters containing alkali-precipitable impurities including phosphates which comprises flowing a horizontally-disposed layer of sea water across and above an anode in [the] contact with a supernatant layer of electrically conductive waste water having a density less than that of the sea water *and* extending above and below a cathode, flowing the layer[s] of waste water across and above the cathode concurrently with the sea water therebelow, both layers being flowed slowly and quietly without substantial mixing, and electrolyzing the layers while maintaining a flow rate and current density that liberate chlorine at the anode and limit chlorine concentration in the sea water layer to about 0.7%, thereby preventing the escape of chlorine gas from the sea water layer, liberate alkali at the cathode in an amount sufficient to make the waste water alkaline, thereby precipitating alkali-precipitable impurities, and liberate hydrogen at the cathode to lift to the surface of the waste water impurities precipitated in the waste water.

2. A process in accordance with claim 1 in which electrolyzed chlorine-containing sea water is mixed with electrolyzed [water] *waste* water to sterilize the waste water.

3. A process in accordance with claim 1 in which the waste water is sewage and sufficient salt solution is added to the sewage to render it electrically conductive while keeping its specific gravity less than the sea water.

*4. A process for the electrolytic treatment of a first aqueous liquid, which contains alkali-precipitable substances, which comprises flowing a horizontally disposed layer of a second aqueous liquid which contains dissolved sodium chloride salt across and above an anode in contact with a supernatant layer of said first aqueous liquid having a density less than that of the second aqueous liquid and extending above and below a cathode, flowing the layer of said first aqueous liquid across and above the cathode concurrently with the second aqueous liquid therebelow, both layers being flowed slowly and quietly without substantial mixing, and electrolyzing the layers while maintaining a flow rate and current density that liberate chlorine at the anode and limit the chlorine concentration in the second aqueous liquid layer to about 0.7%, thereby preventing the escape of chlorine gas from the second aqueous liquid layer, liberate alkali at the cathode in an amount sufficient to make the first aqueous liquid alkaline, thereby precipitating alkali-precipitable substances, and liberate hydrogen at the cathode to lift to the surface of the first aqueous liquid layer substances precipitated in the first aqueous liquid layer.*

References Cited

The following references, cited by the Examiner, are of record in the patented file of this patent or the original patent.

UNITED STATES PATENTS

| | | | |
|---|---|---|---|
| 937,210 | 10/1909 | Harris | 204—149 |
| 1,139,778 | 5/1915 | Landreth | 204—149 |
| 1,746,964 | 2/1930 | Polatsik | 204—149 |

HOWARD S. WILLIAMS, *Primary Examiner.*

JOHN H. MACK, *Examiner.*

T. H. TUNG, *Assistant Examiner.*